United States Patent
Harvey et al.

[15] 3,636,840
[45] Jan. 25, 1972

[54] GENERATOR-POWERED EXPOSURE CONTROL

[72] Inventors: Donald M. Harvey, Webster; George M. Inglis, Marion, both of N.Y.

[73] Assignee: Eastman Kodak Company, Rochester, N.Y.

[22] Filed: Aug. 27, 1970

[21] Appl. No.: 67,332

[52] U.S. Cl. .................................... 95/10 CE, 95/64 C
[51] Int. Cl. ................................................ G03b 7/08
[58] Field of Search ................... 95/10 CE, 10 CT, 10 CD

[56] References Cited

UNITED STATES PATENTS

| | | |
|---|---|---|
| 3,411,421 | 11/1968 | Bestenreiner .......................... 95/10 |
| 3,466,447 | 9/1969 | Fahlenberg ............................ 95/10 |
| 3,511,145 | 5/1970 | Ort ....................................... 95/10 |

*Primary Examiner*—Samuel S. Matthews
*Assistant Examiner*—Michael L. Gellner
*Attorney*—Robert W. Hampton and William F. Delaney, Jr.

[57] ABSTRACT

An exposure control system including a photoelectric control circuit for adjusting the exposure aperture and shutter speed of a camera, and a generator for energizing the circuit. To reduce the power requirements on the generator, the system preferably is adapted to adjust the diaphragm with a fixed shutter speed in normal light conditions, and to adjust the shutter speed with a fixed diaphragm setting in low-light conditions.

6 Claims, 4 Drawing Figures

PATENTED JAN 25 1972

DONALD M. HARVEY
GEORGE M. INGLIS
INVENTORS

BY William F. Delany Jr.
Robert W. Hampton

ATTORNEYS

DONALD M. HARVEY
GEORGE M. INGLIS
INVENTORS

William F. Delany Jr.
BY Robert W. Hampton

ATTORNEYS

GENERATOR-POWERED EXPOSURE CONTROL

BACKGROUND OF THE INVENTION

This invention relates to exposure control systems for use in photographic apparatus, such as cameras, and more particularly to such an exposure control system which selectively adjusts the exposure aperture and the exposure time in accordance with the level of scene illumination.

In previous exposure control systems which automatically establish the length of an exposure interval, provision has been made for automatic adjustment of the exposure aperture immediately preceding initiation of the exposure interval in accordance with anticipated scene light. Such a system in which the shutter speed is controlled by an electronic timing circuit and the exposure aperture is adjusted to one of a plurality of predetermined discrete aperture sizes by an automatic control system is shown in U.S. Pat. No. 3,464,332, issued to Davidson et al. on Sept. 2, 1969.

Such prior art shutter control systems have been energized by a battery contained in the camera. Although such arrangements are generally satisfactory, they rely on the availability of sufficient power from the battery. When the battery power is inadequate for operation of the control system, either the shutter operates at its fastest speed or it remains open indefinitely, depending on the type of shutter control, and the diaphragm is not adjusted to an appropriate setting.

Photographic apparatus that employ electric generators for energizing exposure control circuits also are well known in the art. However, such apparatus powered by a generator have not been adapted to adjust both the diaphragm and shutter speed, since the generators employed in such devices usually are relatively small and simple devices that do not provide adequate power for such a plurality of adjustment operations.

SUMMARY OF THE INVENTION

It is an object of the present invention to provide an improved automatic exposure control system for selectively adjusting the exposure aperture and shutter speed of a camera, including a generator powered control circuit.

It is another object of this invention to provide such a generator-powered exposure control system which requires few moving parts to reduce the complexity and cost of assembly and to increase reliability in operation.

It is a further object of this invention to provide such a system for selectively adjusting the diaphragm and shutter speed of a photographic apparatus with a signal means for indicating when scene illumination is below a predetermined level.

An exposure control system according to the preferred embodiment of this invention comprises a photoelectric control circuit for adjusting the diaphragm and shutter speed of a camera, and an electric generator for energizing the circuit. To reduce the power requirements on the generator, this system preferably is adapted to adjust the diaphragm with a fixed shutter speed in normal light conditions and to adjust the shutter speed with a fixed diaphragm setting in low light conditions. In the disclosed embodiment of the invention the control circuit actuates a diaphragm mechanism to adjust the exposure aperture to a size suitable for the level of scene illumination, and the shutter is then actuated to operate at a mechanically fixed speed in normal lighting conditions. However, in low-scene light conditions the diaphragm mechanism is automatically adjusted to its maximum aperture and the circuit establishes the shutter speed in accordance with the level of scene illumination. Thus, the exposure control circuit is employed to adjust the diaphragm in normal scene light conditions, or to adjust the shutter speed in low-scene light conditions so that the power requirements on the generator are not increased by the plurality of adjustment functions. In addition, the system can be provided with a low-light signal that requires no additional power from the generator.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

Because cameras are well known, the present description will be directed in particular to elements forming part of, or cooperating more directly with, the present invention. Camera elements not specifically shown or described may take various forms well known to those skilled in the art.

An exposure control system according to the present invention includes an adjustable diaphragm mechanism for varying the exposure aperture in accordance with the level of scene light, and a shutter mechanism adapted to operate at a fixed mechanical speed in normal light conditions or to be controlled by a photoelectric time-delay circuit that establishes the length of an exposure interval in low scene light conditions. The time-delay circuit preferably is of the integrating type for continuously measuring the total accumulated amount of light energy incident on a photoresponsive member.

Figure 1:
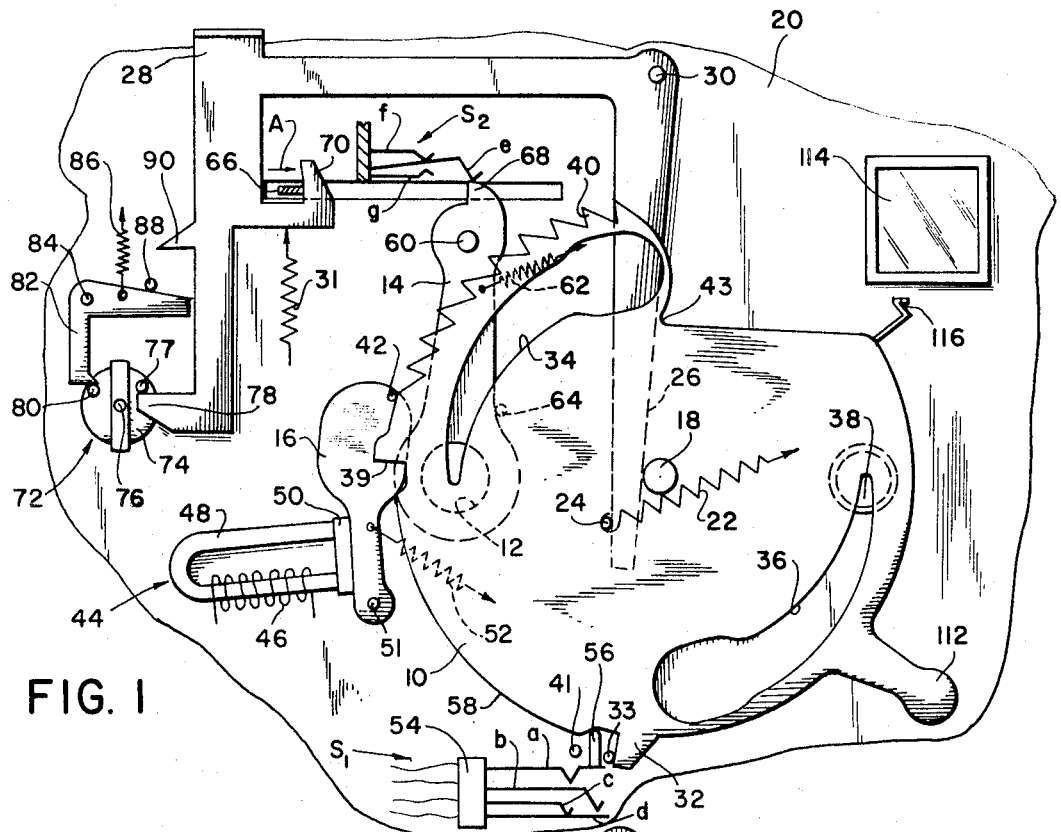
FIG. 1 is a schematic view of an exposure control apparatus according to the preferred embodiment of the invention in its cocked condition.
Figure 2:
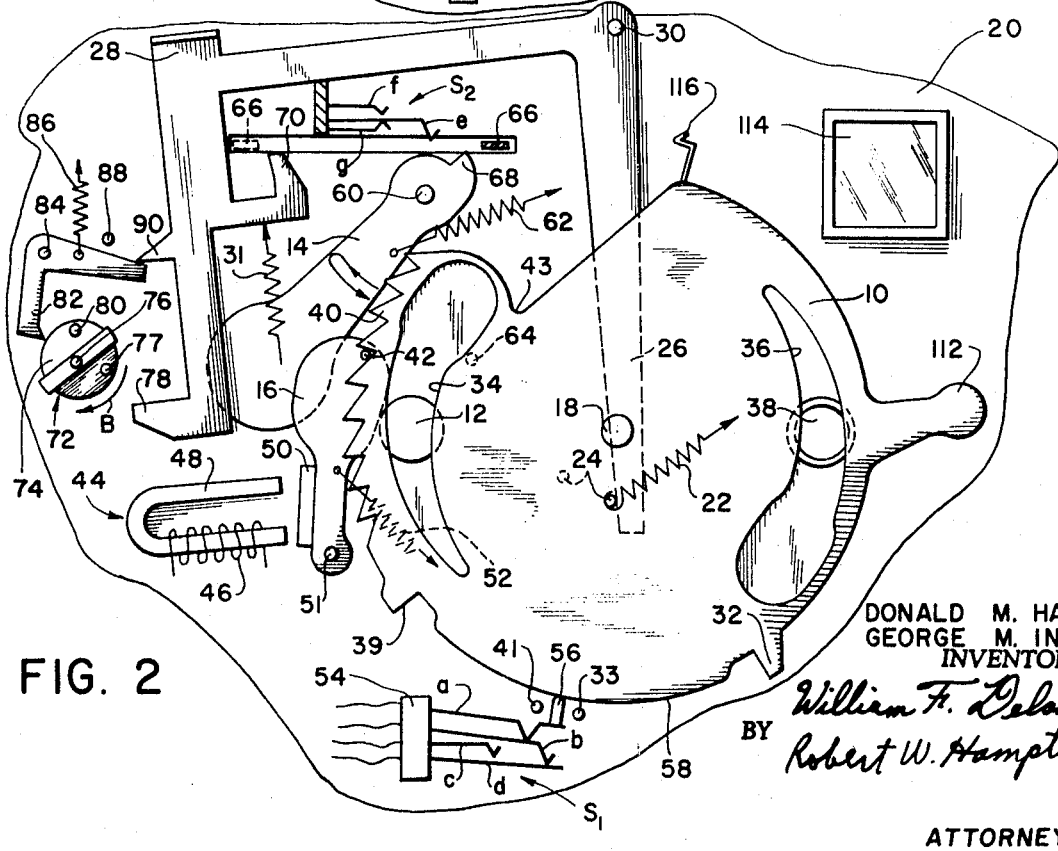
FIG. 2 is a view of the exposure control apparatus in FIG. 1 after the shutter has opened to initiate an exposure interval in normal scene light conditions.
Figure 3:
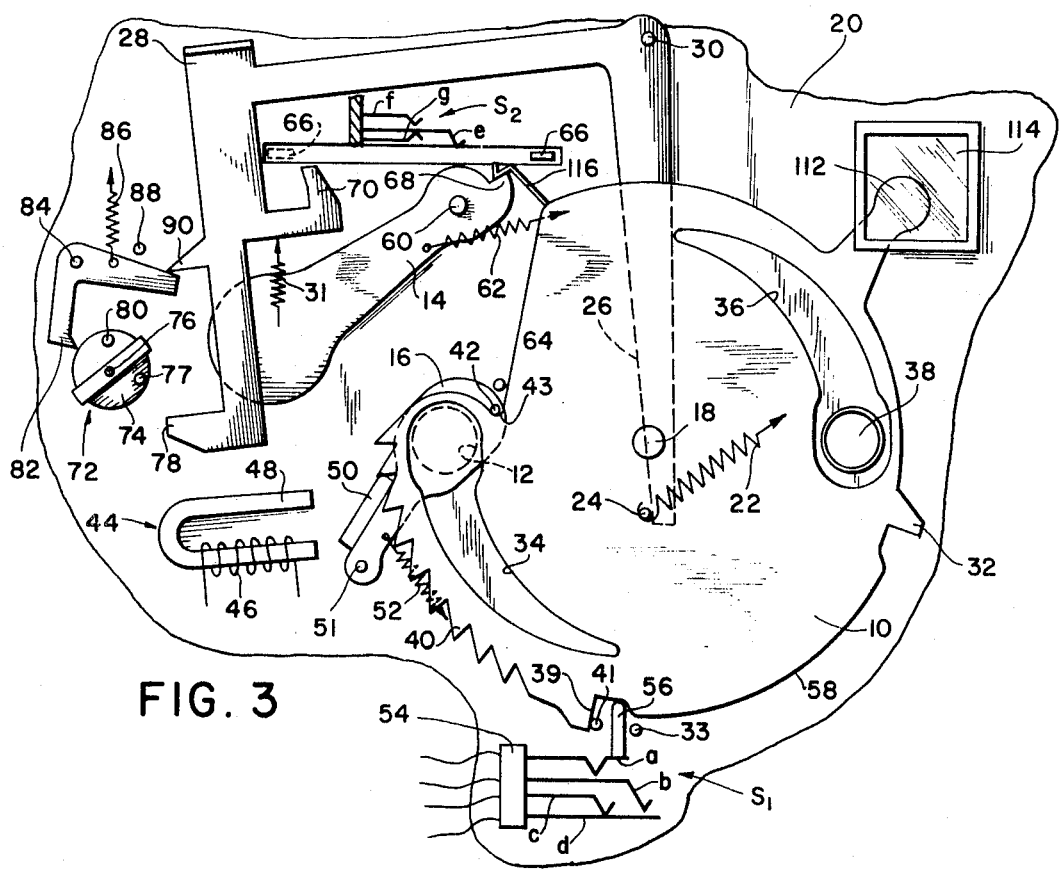
FIG. 3 is a view of the exposure control apparatus of FIG. 1 after termination of an exposure interval in low-scene light conditions.

Referring now to the accompanying drawings, FIGS. 1–3 show an exposure control apparatus according to a preferred embodiment of the invention, including a movable diaphragm blade 10 for establishing a variable exposure aperture in alignment with an objective 12, and a shutter mechanism including an opening blade 14 and a closing blade 16.

The diaphragm blade is mounted for rotational movement on a pin 18 attached to a support blade 20 of the camera. The blade 10 is biased by a spring 22 for rotational movement in a counterclockwise direction, but the blade is retained in the cocked position shown in FIG. 1 by engagement of a detent 24 on the blade with a lever 26 extending from a camera actuating member 28 accessible from the exterior of the camera. The camera actuating member is pivotally mounted on a pin 30 attached to the camera support plate, and it is biased by a spring 31 towards the cocked position shown in FIG. 1, in which it holds a projection 32 on the periphery of the blade in engagement with a stop 33 on the support plate 20.

Figure 4:
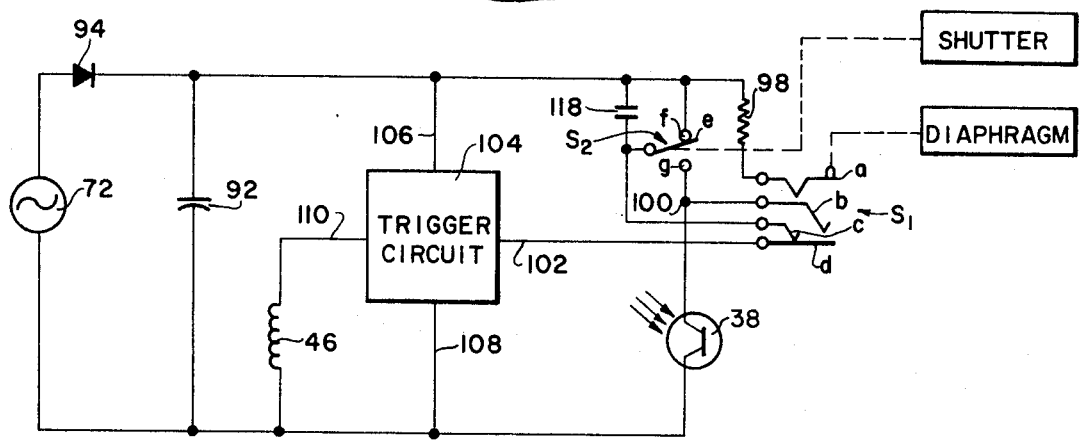
FIG. 4 is an example of an electronic time-delay circuit which can be employed with the shutter apparatus shown in FIGS. 1–3.

The diaphragm blade 10 has two apertures 34 and 36 having a teardrop shape, which are positioned in masking relation to the objective lens 12 and a photoresponsive cell 38 which is electrically connected with the circuit in FIG. 4. Rotational movement of the diaphragm blade 10 in a counterclockwise direction results in a continuously increasing aperture over the lens and the photocell, until another projection 39 on the periphery of the blade 10 engages a stop 41 in which position the largest portions of the apertures are over the lens and photocell. The diaphragm blade 10 also includes on its periphery a plurality of ratchet teeth 40 and a notch 43, which are adapted to cooperate with a pawl 42 on the closing shutter blade 16 under the control of a transducer 44. The transducer includes a coil 46 electrically connected with the circuit in FIG. 4, and a core 48 positioned such that a permanent magnet 50 on the closing shutter blade 16 is magnetically attracted to the core 48. Thus, the shutter blade 16, which is pivotally mounted on a pin 51 attached to the support plate 20, is retained in the position shown in FIG. 1 by the permanent magnet 50 until the transducer is energized to oppose the magnet's field, which permits the blade 16 to move in a clockwise direction under the bias of a spring 52. When the diaphragm blade 10 is released to rotate in a counterclockwise direction, the apertures over the lens 12 and the photocell 38 increase until the transducer 44 is actuated by the circuit shown in FIG. 4 to release the diaphragm blade 10 to engage the pawl 42 with one of the ratchet teeth 40, thereby establishing the exposure aperture aligned with the objective lens 12 at a size suitable for the level of illumination at a predetermined shutter speed. The engagement of the pawl with the ratchet maintains the closing shutter blade 16 away from its covering position over the exposure aperture so that an exposure can be initiated and terminated by the blade 14. However, when there is insufficient light for a proper exposure at the predetermined shutter speed, the circuit shown in FIG. 4 is adapted to maintain the coil 46 in an unenergized condition so that the diaphragm blade 10 continues its movement to its maximum aperture position in which the notch 43 is aligned with the pawl 42 to enable actuation of the closing blade 16 to move to its covering position over the objective to terminate an exposure interval.

Also associated with the diaphragm blade 10 is a four-pole gang switch S1 having a base member 54 from which extend three relatively flexible contact arms a, b and c which are normally spaced from each other, and a fourth contact arm d which is normally engaged with the contact c. A detent 56 on the contact a extends between the stops 33 and 41 to contact a projection 58 that extends along a portion of the periphery of the diaphragm blade 10, so that the contacts assume the normal position shown in FIG. 1 when the diaphragm blade is at its minimum aperture position or its maximum aperture position. However, when the diaphragm blade 10 is in one of its intermediate positions, the detent 56 is engaged by the projection 58 to electrically connect the contacts a, b and d, and to disengage the contact c from the other contacts, as shown in FIG. 2. The switch S1 is included in the control circuit shown in FIG. 4 and its operation synchronizes actuation of that control circuit, as described below with respect to that figure.

The opening shutter blade 14 is pivotally mounted on a pin 60 attached to the support plate 20 of the camera. Both shutter blades are mounted for pivotal movement into and out of blocking position with respect to the objective 12 to control the initiation and termination of exposure intervals. In the cocked position shown in FIG. 1 the opening blade 14 is biased by a spring 62 to a blocking position covering the objective 12, where the blade engages a detent 64 on the support plate 20. As explained above, the closing blade 16 is retained in an unblocking position by the attraction of the permanent magnet 50 to the core 48 of the transducer 44. To actuate the shutter mechanism a shutter driver 66 is provided, which is biased by a spring (not shown) in the direction of arrow A toward engagement with a detent 68 on the opening blade 14. The driver 66 is retained against its bias in the cocked position shown in FIG. 1 by engagement with a detent 70 on the camera actuating member 28. Associated with the shutter blade detent 68 is a switch S2 for selectively connecting a common contact e with contacts f or g. The common contact e is biased toward the contact g, but it is maintained by the detent 68 in engagement with the contact f when the opening blade 14 is in its covering position.

To energize the exposure control circuit in FIG. 4 a generator 72 is provided, which includes a drive member 74 which is biased for rotation in a clockwise direction about an axis 76. The drive member 74 includes a first detent 77 which is engageable by a lug 78 on the camera actuating member 28 such that return of the actuating member to its cocked position shown in FIG. 1 after an exposure causes the lug 78 to engage the detent 77 and rotate the drive member 74 in a counterclockwise direction against the bias of the generator drive spring (not shown). In this position, a second detent 80 on the drive member is releasably retained by a lever 82 which is pivotally mounted on a pin 84 attached to the camera support plate 20, and which is biased by a spring 86 against a detent 88 on the camera support plate.

When the camera actuating member 28 is depressed, the lug 78 is removed from engagement with the detent 77 on the drive member, and another lug 90 on the release member 28 engages the lever 82 to release the detent 80 and the biased drive member 74 of the generator 72 for rotation to energize the circuit shown in FIG. 4. The generator 72 charges a storage capacitor 92 through a rectifying diode 94, and at the same time the lever 26 is pivoted in a counterclockwise direction to permit the diaphragm blade 10 to rotate in a counterclockwise direction to gradually increase the photocell and lens apertures and to close the contacts a, b and d and to disengage the contact c of the switch S1. The switch S1 is adapted to close first the contacts a and b which connects the photodiode 38 in series with a resistance 98 to form a voltage divider circuit that provides a voltage at a junction 100 that is functionally related to the level of illumination incident on the photocell. When the contact b then engages the contact d, the junction 100 is connected to the input 102 of a trigger circuit 104, which is adapted to switch from a nonconductive state to a conductive state when the voltage at the input 102 reaches a predetermined value. This circuit is not shown in detail, since this type of circuit is well known in the art. One well known example of such a circuit is a Schmitt trigger. The trigger circuit 104 includes a power lead 106, a ground lead 108 and an output lead 110. The trigger circuit in this embodiment is adapted to conduct current from the power lead 106 to the output lead 110 only when the potential at the input 102 is below a predetermined value.

Thus, when the switch S1 has its contacts a, b and d closed by the diaphragm projection 58, the trigger circuit 102 will conduct to energize the coil 46 of the transducer 44 if the illumination incident on the photodiode 38 is above a predetermined level. Therefore, when the diaphragm blade 10 reaches a position at which the aperture over the photocell is sufficiently large for the level of scene illumination to actuate the transducer 44, the energization of the coil 46 releases the shutter blade 16 for movement in a clockwise direction so that the pawl 42 will engage one of the ratchet teeth 40 on the diaphragm blade to retain the blade in that position, as shown in FIG. 2. Further depression of the camera release lever 28 will then release the drive member 66 from engagement with the detent 70, to enable the drive member 66 to strike the detent 68 on the shutter blade 14 and rapidly rotate that blade in a clockwise direction away from its covering position over the objective 12 to initiate an exposure. After a predetermined length of time, the shutter blade 14 returns to its covering position under the influence of the spring 62 to terminate the exposure interval. Thus, in normal lighting conditions the exposure control circuit in FIG. 4 adjusts the exposure aperture, and the shutter speed is mechanically predetermined.

In low light conditions the diaphragm blade 10 will continue its movement until the projection 39 on the blade engages the stop 41, in which position the apertures over the lens and photocell are at a maximum. In this maximum aperture position a flag 112 on the diaphragm blade is positioned in the field of a viewfinder 114 on the camera to indicate to an operator of the camera the existence of low light conditions, and the operator can then release the actuating member 28 if he decides not to initiate the exposure interval in such conditions. Alternatively, the operator can continue depressing the actuating member 28 to release the drive member 66 to open the shutter blade 14. However, when the shutter blade opens with the diaphragm blade at its maximum aperture position, a latch member 116 on the diaphragm blade is positioned to engage the shutter blade detent 68 and retain the opening shutter blade 14 in its uncovering position, as seen in FIG. 3. Movement of the diaphragm blade 10 to its maximum aperture position also actuates the switch S1 to disengage the contacts a, b and d, and to close the contacts c and d to connect input 102 of the trigger circuit 104 with a capacitor 118 which is shunted through contacts e and f of the switch S2, as shown in FIG. 4. When the shutter blade 14 subsequently moves to its uncovering position to initiate an exposure interval, the common contact e of switch S2 is actuated to move into engagement with the contact g to remove the shunt across the capacitor 118 and to connect the junction between the input 102 and the capacitor 118 to the photodiode 38. Thus, the capacitor 118 and the photodiode 38 are connected in series to operate as an integrating circuit with the capacitor being charged through the photodiode at a rate determined by the light level incident on the photodiode. Upon actuation of the switch S2 to connect the capacitor and photocell in series, the voltage at the input 102 connected to the junction between the capacitor and the photocell changes from its initial potential to a predetermined value in a period of time depending on the well-known time constant "RC" of the integrating circuit, which is determined by the value of the capacitor and the effective resistance value of the photocell 38 as established by the intensity of light from the scene to be photographed. When the voltage at the input terminal 102 of the trigger circuit 104 reaches the predetermined value, the trigger circuit is caused to trigger or switch from its nonconductive state to its conductive state thereby actuating the coil 46 to produce a magnetic field in the core 48 in opposition to the magnetic attraction of the permanent magnet 50 to release the closing shutter blade 16 for movement under the bias of the spring 52 to its blocking position covering the objective 12 with the pawl 42 located in the notch 43. Thus, the exposure interval is initiated simultaneously with the activation of the integrating circuit by the actuation of switch S2, and it is terminated by the trigger circuit 104 after a period of time determined by the integrating circuit according to the illumination incident on the photodiode 38. Therefore, the length of the exposure interval is determined by the integrating circuit as a function of the level of scene illumination incident on the photocell. Thus, it is seen that in low light conditions the shutter speed is controlled by the exposure control circuit shown in FIG. 4 with the diaphragm mechanically adjusted to its maximum aperture position.

It can be seen that the exposure control system described herein provides for selective control of the diaphragm and shutter speed of a camera by means of a generator-powered exposure control circuit that requires no more power from the generator than prior art systems require for generator-powered control systems adapted to adjust only the diaphragm or the shutter speed. In addition, the system of this invention provides for a low light signal which requires no additional generator power.

The invention has been described in detail with particular reference to preferred embodiments thereof, but it will be understood that variations and modifications can be effected within the spirit and scope of the invention.

We claim:

1. In a camera adapted to expose film to scene light, an exposure control apparatus comprising:
   a. photoresponsive means adapted to receive illumination from an object scene for varying an electrical parameter as a function of the level of scene illumination incident thereon;
   b. diaphragm means for establishing an exposure aperture, said diaphragm means including a member movable along a path to adjust the size of the exposure aperture;
   c. electrically energizable circuit means connected with said photoresponsive means, said circuit means including:
      1. means for establishing the position of said diaphragm member along its path in accordance with said electrical parameter to establish the exposure aperture at a size suitable for the level of illumination incident on said photoresponsive means, and
      2. means for establishing a time period as a function of said electrical parameter, said circuit being activatable to initiate such a time period and to produce a control signal at the end of the time period;
   d. actuatable shutter means for covering and uncovering the exposure aperture;
   e. means for actuating said shutter mechanism to uncover said exposure aperture to initiate an exposure interval after said exposure aperture has been adjusted;
   f. means for automatically actuating said shutter mechanism to cover said exposure aperture a predetermined period of time after initiation of an exposure interval when the illumination incident on said photoresponsive means is above a predetermined level;
   g. means for activating said circuit means to initiate a time period in synchronization with actuation of said shutter means to initiate an exposure interval
   h. means for actuating said shutter mechanism to terminate the exposure interval in response to said control signal when the illumination incident on said photoresponsive means is below said predetermined level, so that the duration of the exposure interval is determined by said circuit means in low light conditions; and
   i. an electric generator electrically connected with said circuit means, said generator including drive means actuatable to energize said circuit means.

2. In a camera adapted to expose film to scene light, an exposure control apparatus comprising:
   a. photoresponsive means adapted to receive illumination from an object scene for varying an electrical parameter as a function of the level of scene illumination incident thereon;
   b. diaphragm means for establishing an exposure aperture, said diaphragm means including a member movable along a path to adjust the size of the exposure aperture;
   c. electrically energizable, diaphragm-control circuit means connectable with said photoresponsive means and activatable to establish the position of said diaphragm member along its path in accordance with said electrical parameter to establish the exposure aperture at a size suitable for the level of illumination incident on said photoresponsive means;
   d. actuatable shutter means for covering and uncovering the exposure aperture;
   e. electrically energizable, activatable, time-delay circuit means connectable with said photoresponsive means for producing a control signal a period of time after activation thereof, said time-delay circuit means including means for establishing the time period as a function of said electrical parameter;
   f. an electrical switch normally connecting said photoresponsive means with said diaphragm-control circuit means, and actuatable to alternatively connect said photoresponsive means with said time-delay circuit means;
   g. control means for activating said diaphragm-control circuit means to adjust the exposure aperture in accordance with the level of illumination on said photoresponsive means;
   h. means for actuating said shutter mechanism to uncover said exposure aperture to initiate an exposure interval after said exposure aperture has been adjusted;
   i. means for automatically actuating said shutter mechanism to cover said exposure aperture a predetermined period of time after initiation of an exposure interval when the illumination incident on said photoresponsive means is above a predetermined level;
   j. means for actuating said switch and activating said time-delay circuit means in synchronization with the actuation of said shutter means to uncover said exposure aperture;
   k. means for actuating said shutter mechanism to cover said aperture in response to said control signal when the illumination incident on the photoresponsive means is below said predetermined level, so that for low levels of scene illumination the exposure interval is determined by the time-delay circuit means as a function of scene illumination; and
   l. an electric generator electrically connected with said diaphragm-control circuit means and said time-delay circuit means, said generator including drive means associated with said control means for energizing said circuit means.

3. An exposure control apparatus as claimed in claim 2 further comprising means for providing a signal when the illumination incident on said photoresponsive means is below said predetermined level.

4. An exposure control apparatus as claimed in claim 2 wherein said switch is associated with said diaphragm member for actuation thereby to activate said diaphragm control circuit means when said diaphragm member is at any position along its path except its maximum aperture position, and to deactivate said diaphragm-control circuit means when said diaphragm member is in its maximum aperture position.

5. In a camera adapted to expose film to scene light, an exposure control apparatus comprising:
  a. photoresponsive means adapted to receive illumination from an object scene for varying an electrical parameter as a function of the level of scene illumination incident thereon;
  b. diaphragm means for establishing an exposure aperture, said diaphragm means including a member movable along a path to adjust the exposure aperture from a minimum size to a maximum size, said diaphragm member being biased towards its maximum aperture position;
  c. releasable retaining means for holding said diaphragm member in its minimum aperture position, said retaining means being actuatable to release said diaphragm member for movement under the influence of its bias along its path towards its maximum aperture position;
  d. electromechanical transducer means actuatable to block further movement of said diaphragm member along its path;
  e. electrically energizable, diaphragm-control circuit means connectable with said photoresponsive means and activatable to actuate said transducer means to establish the exposure aperture at a size suitable for the level of illumination incident on said photoresponsive means when that illumination is above a predetermined level;
  f. control means for activating said diaphragm-control circuit means and for actuating said retaining means to adjust the exposure aperture;
  g. actuatable shutter means for covering and uncovering the exposure aperture;
  h. means for actuating said shutter mechanism to uncover said exposure aperture to initiate an exposure interval after said exposure aperture has been adjusted;
  i. return means for automatically actuating said shutter mechanism to cover said exposure aperture a predetermined period of time after initiation of an exposure interval;
  j. means for disabling said shutter return means to prevent said shutter means from terminating an exposure interval after a predetermined period when the scene illumination is below said predetermined level;
  k. electrically energizable, activatable, time-delay circuit means connectable with said photoresponsive means for producing a control signal a period of time after activation thereof, said time-delay circuit means including means for establishing the time period as a function of said electrical parameter;
  l. an electrical switch normally connecting said photoresponsive means with said diaphragm-control circuit means, and actuatable to alternatively connect said photoresponsive means with said time-delay circuit means;
  m. means for actuating said switch and activating said time-delay circuit means in synchronization with the actuation of said shutter means to uncover said exposure aperture;
  n. means for actuating said shutter means to cover said aperture in response to said control signal when the illumination incident on the photoresponsive means is below said predetermined level, so that for low levels of scene illumination the exposure interval is determined by the time-delay circuit means as a function of scene illumination; and
  o. an electric generator electrically connected with said diaphragm-control circuit means and said time-delay circuit means, said generator including drive means associated with said control means for energizing said circuit means.

6. In a camera adapted to expose film to scene light, an exposure control apparatus comprising:
  a. photoresponsive means adapted to receive illumination from an object scene for varying an electrical parameter as a function of the level of scene illumination incident thereon;
  b. diaphragm means for establishing an exposure aperture, said diaphragm means including a member movable to any position along a path to vary the exposure aperture from a minimum size to a maximum size, said diaphragm member being biased toward its maximum aperture position;
  c. latch means for releasably retaining said diaphragm member in its minimum aperture position and actuatable to release said diaphragm member for movement under the influence of its bias towards its maximum aperture position;
  d. electromechanical transducer means actuatable to block further movement of said diaphragm member along its path;
  e. a voltage-sensing trigger circuit coupled with said transducer and adapted to switch from a first state to a second state to actuate said transducer when an input voltage is below a predetermined level;
  f. first circuit means connectable with the input of said trigger circuit and with said photoresponsive means for producing a voltage at the trigger circuit input that varies as a function of the level of illumination incident on said photoresponsive means;
  g. switch means for connecting said first circuit means with said trigger circuit to actuate said transducer when said diaphragm member is at a position in which said exposure aperture is suitable for the level of illumination incident on said photoresponsive means;
  h. control means for activating said diaphragm-control circuit means and for actuating said retaining means to adjust the exposure aperture;
  i. actuatable shutter means for covering and uncovering the exposure aperture;
  j. means for actuating said shutter means to uncover said exposure aperture to initiate an exposure interval after said exposure aperture has been adjusted;
  k. return means for automatically actuating said shutter means to cover said exposure aperture a predetermined period of time after initiation of an exposure interval;
  l. means for disabling said return means when said diaphragm member is in its maximum aperture position;
  m. activatable second circuit means connectable with the input of said trigger circuit and with said photoresponsive means for producing a voltage at the trigger circuit input that varies from a second predetermined level when activated to said first predetermined level over a period of time that is a function of the level of illumination;
  n. second switch means for connecting said second circuit means with said trigger circuit for switching said trigger circuit from said first state to said second state a period of time after activation of said second circuit established as a function of the level of scene illumination, said second switch means being actuatable in response to movement of said diaphragm member to its maximum aperture position;
  o. means for activating said second circuit means in synchronization with the actuation of said shutter means to uncover said exposure aperture;
  p. means for covering the aperture in response to switching of said trigger circuit from its second state to its first state when the illumination on the photoresponsive means is below a predetermined level to terminate the exposure interval when the voltage from said second circuit means reaches said first predetermined voltage level, so that for low levels of scene illumination the exposure interval is determined by said second circuit means as a function of the level of scene illumination; and q. an electric generator electrically connected with said first and second circuit means and with said trigger circuit, said generator including drive means associated with said control means for energizing said circuits.

* * * * *